United States Patent [19]
Lorentz et al.

[11] Patent Number: 5,931,315
[45] Date of Patent: Aug. 3, 1999

[54] MODULAR STORAGE AND DISPLAY DEVICE

[76] Inventors: Hilel Lorentz, 13, Ben Zvi Street, Petach Tikva 49375, Israel; Rony Levy, 37 Shimon Hatarsi Street, Tel Aviv 69492, Israel

[21] Appl. No.: 08/776,572

[22] PCT Filed: Jul. 31, 1995

[86] PCT No.: PCT/US95/09707

§ 371 Date: Apr. 16, 1997

§ 102(e) Date: Apr. 16, 1997

[87] PCT Pub. No.: WO96/04657

PCT Pub. Date: Feb. 15, 1996

[30] Foreign Application Priority Data

Aug. 2, 1994 [IL] Israel ........................................ 110543

[51] Int. Cl.⁶ ...................................................... A47F 5/00
[52] U.S. Cl. ............................ 211/40; 211/163; 211/205; 312/9.58; 206/308.1
[58] Field of Search ................................... 211/40, 41.12, 211/163, 168, 205, 96, 95; 312/9.58, 9.9; 206/308.1, 387.15

[56] References Cited

U.S. PATENT DOCUMENTS

| | | |
|---|---|---|
| 3,370,820 | 2/1968 | Liss et al. . |
| 4,368,934 | 1/1983 | Somers ........................... 206/387.15 X |
| 5,423,434 | 6/1995 | Chen .................................... 312/9.58 X |
| 5,439,119 | 8/1995 | Chow .................................... 211/40 X |
| 5,697,684 | 12/1997 | Gyovai ................................ 211/168 X |

*Primary Examiner*—Robert W. Gibson, Jr.
*Attorney, Agent, or Firm*—Oliff & Berridge PLC

[57] ABSTRACT

A modular storage and display device for essentially flat containers. The display device has a vertically retained column and a plurality of connecting members mounted on the column. The connecting members have a pair of resiliently displaceable gripping arms integrally formed at one portion of the connecting members. The arms are adapted to snap fit around the column so the connecting member is rotatable around and slidable along the longitudinal axis of the column. A system for gripping an edge portion of the container is disposed on another portion of the connecting member.

30 Claims, 14 Drawing Sheets

MODULAR STORAGE AND DISPLAY DEVICE

FIELD OF THE INVENTION

The present invention is in the field of modular storage and display devices and more specifically it is concerned with a modular device for storing and displaying essentially flat containers.

BACKGROUND OF THE INVENTION

Storage and display devices for flat containers such as for example, compact disk, video and audio cassette containers and the like, have always been a subject for designers. Such devices should be, on the one hand, functional enabling storage of a maximum number of objects in a minimum space and with optimal access to items contained within such containers and, on the other hand, should be pleasing to the eye.

An important and highly desired character required from such devices is that they should preferably be modular, i.e. to facilitate expansion of their capacity and alter the arrangement of the stored and displayed objects. A still further desirable feature is that such devices should be able to receive a variety of containers with varying dimensions and also containers holding more than one article e.g. containers holding two compact-disks.

Storage and display devices for such flat containers have been previously proposed. For example there are known box-like storage structures in which the containers are retained vertically within receiving slots. The disadvantage of all such structures is that the content of the containers is not visible and inspecting their contents is not possible without removal from the storage structure. Furthermore, such structures occupy a relatively large space as compared with total amount of the accommodated containers.

G.B. Patent specification No. 2,239,595 discloses a storage and display device comprising a base mounted column adapted to have mounted thereon several display units each of which holding an article to be displayed. According, to this specification, each display unit is provided with an annular collar fitting around the column and a container gripping member attached to the collar and capable of rotation about a horizontal axis.

However, according to the disclosure of this specification, the contents of a stored container cannot be inspected without first removing the container from its gripping, member. Another drawback of this prior disclosure is that it is not a modular structure. Thus, adding or rearranging the disks along the column requires removal of all the preceding containers.

It is therefore an object of the present invention to provide a new and improved modular storing and display device in which the above-referred to disadvantages are substantially reduced or overcome and the above-referred to desiderata are substantially fulfilled.

SUMMARY OF THE INVENTION

According to the present invention there is provided a modular storage and display device for essentially flat containers comprising a vertically retained column and a plurality of connecting members mounted on said column, characterized in that said connecting members arc integrally formed at one portion thereof with a pair of resiliently displaceable gripping arms adapted to snap fit around the column so as to be rotatable around a longitudinal axis of the column and at an opposed portion of the connector with means for gripping an edge portion of the container.

A typical container with which the present invention is concerned comprises a base member, front and rear walls and a flap hinged adjacent a rear end thereof such as compact disk, video and audio cassette containers and the like, wherein according to one embodiment, the gripping means of said connecting member consists of a U-shaped structure formed of a top and a bottom essentially, horizontally extending supports, the distance between said supports being essentially equal to the thickness of the container, at least one of said supports being provided adjacent a rear wall of said gripping means with a grove suitable for snappingly receiving a ridge vertically projecting from an edge of the base member or flap of said container; the arrangement being such that a rear edge portion of said container is forcibly engaged between said flat supports and the rear wall of said container bears against the rear wall of said gripping element.

According to a preferred embodiment, said gripping means has a U-like structure formed of a top and a bottom essentially horizontally extending support, said top support comprising a groove suited for receiving a top edge of the container's front face, the arrangement being such that said front face is engaged by said gripping means with the front face thereof bearing against a rear wall of said gripping means and with the container's hinged flap closing on said top support.

Preferably, the connecting members according to the present invention are provided with attachment means for fixing the container to said connecting member. Said attachment means may be for example an adhesive portion, a hook and pile fastener portion (known as VELCRO®), or a fastening screw.

According to the present invention there is also provided for use in a modular storage and display device for essentially flat containers having a hinged flap such as compact disk, video and audio cassette containers and the like, a connecting member characterized in that it comprises a resilient attachment for snapping attachment to a substantially vertical column so as to be rotatable around a longitudinal axis of said column and gripping means for firmly holding one such container, where opening of the flap and removal of the container's content is enabled while the container is gripped by the connecting member.

The invention further provides a preferred embodiment of a connecting member wherein said gripping means consist of a top and a bottom essentially horizontally extending flat supports, the distance between said supports being essentially equal to the thickness of the container to be stored, at least one of said supports having a grove adjacent a rear wall of said gripping means for snapingly accommodating a ridge vertically projecting from a flat face of said container; the arrangement being such that a hinged edge of said container is forcibly engaged between said flat supports and a rear face of said container bears against the rear wall of said clipping clement.

In accordance with a preferred embodiment, said gripping means consist of a top and a bottom essentially horizontally extending flat supports, said top support comprising a groove adapted for receiving a top edge of a front face of said container, the arrangement being such that a non-hinged edge of said container is engaged with said gripping means with the front face thereof bearing against the rear wall of the gripping means and with the container's hinged flap closing on said top support.

In still a preferred embodiment of the present invention, said rear wall of the gripping means comprises at each end thereof a lateral and substantially vertical projection for arresting the container between said projections and preventing movement of the container in a horizontal plane. Furthermore, said connecting member comprises a longitudinal, horizontal protrusion, extending essentially the entire width of the container and having a slanted bottom surface adapted for snapping engagement with a top surface of the container's hinged flip cover, and for preventing dust from entering the container.

In still a preferred embodiment of the invention, said resiliently attachment member consists of an essentially annular cross-sectioned element made of resilient material and having an internal diameter similar to the diameter of said column and provided with at least one radial opening for snapingly receiving said column.

DESCRIPTION OF THE DRAWINGS

For better understanding, the invention will now be described, by way of example only, with reference to the accompanying drawings in which.

DETAILED DESCRIPTION OF PREFERRED EMBODIMENTS

Figure 1:
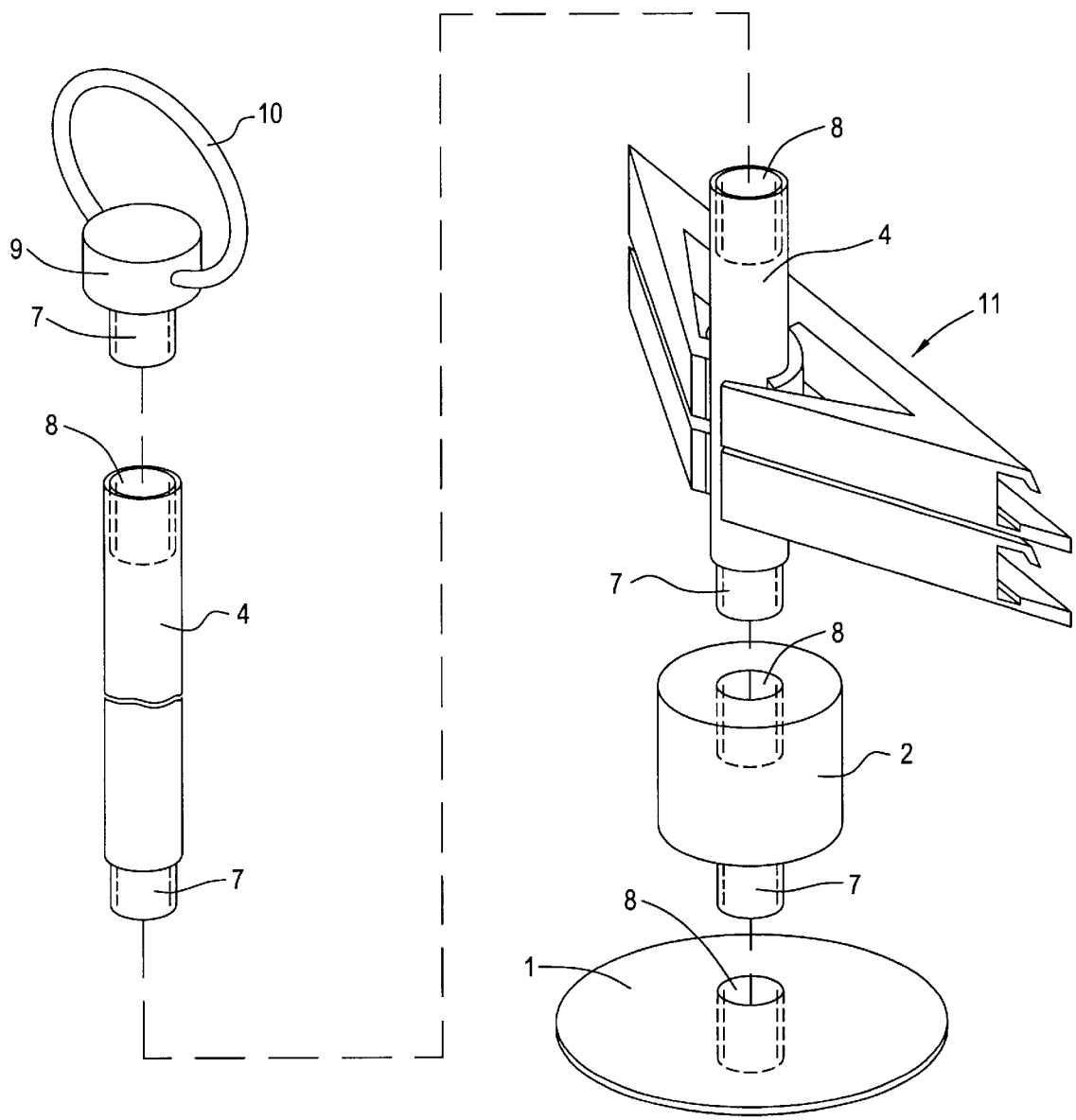
FIG. 1 is an exploded view of a floor model device according to the present invention with only two connecting members mounted for sake of clarity.
Figure 2:
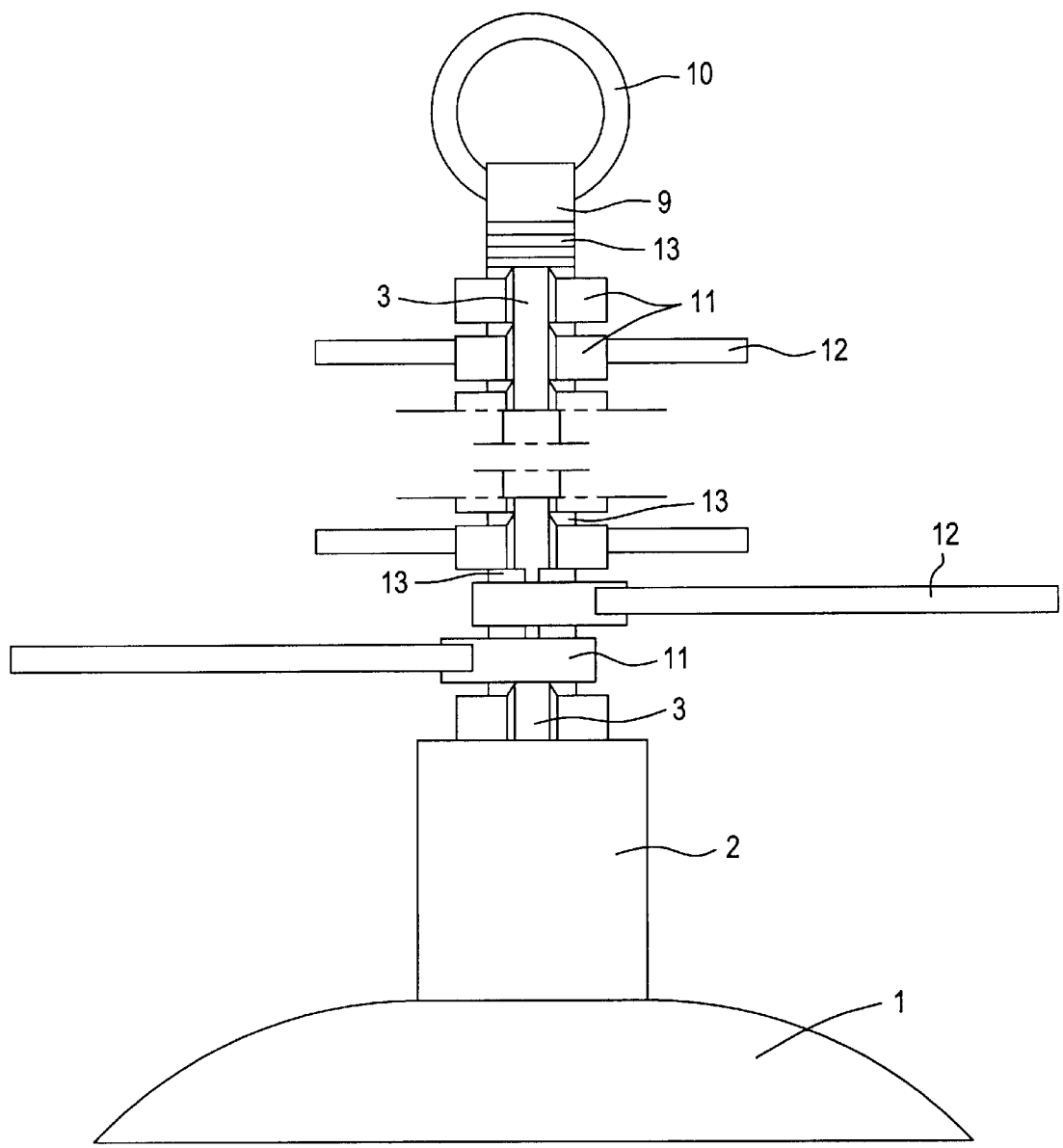
FIG. 2 is a perspective view of the embodiment of FIG. 1 with flat containers accommodated in only some of the connecting members.

Reference is first made to FIGS. 1 and 2 of the drawings in which a floor mounted device according to the present invention consists of a base member 1 into which is screw-engaged a lower limit member 2 into which is screw-engaged a column 3 consisting of several successive component columns 4. The height limit member 2 and the component columns 4 are each provided at one end with a threaded shank 7 and at the other end with a threaded bore 8 suitable for receiving said threaded shank 7.

An end piece 9 is fitted with a threaded shank 7 and a ring 10 suitable for lifting and transferring the device from place to place.

A plurality of connecting members 11 (only several seen in each of the Figs.) are snappingly mounted on the column 3 in a manner which will hereinafter be explained. Some of the connecting members 11 of FIG. 2 have containers 12 fitted to them as will be later explained in detail. As seen in FIG. 2 the purpose of the lower limit member 2 is to limit the location of the lowermost connecting member. Further seen in FIG. 2 are several spacers 13 filling the gap between the top-most connecting member 11 and the end piece 9. Between each two adjacent connecting members there is also provided a spacer 13 for reducing friction between the rotatable connecting, members 11.

Figure 3:
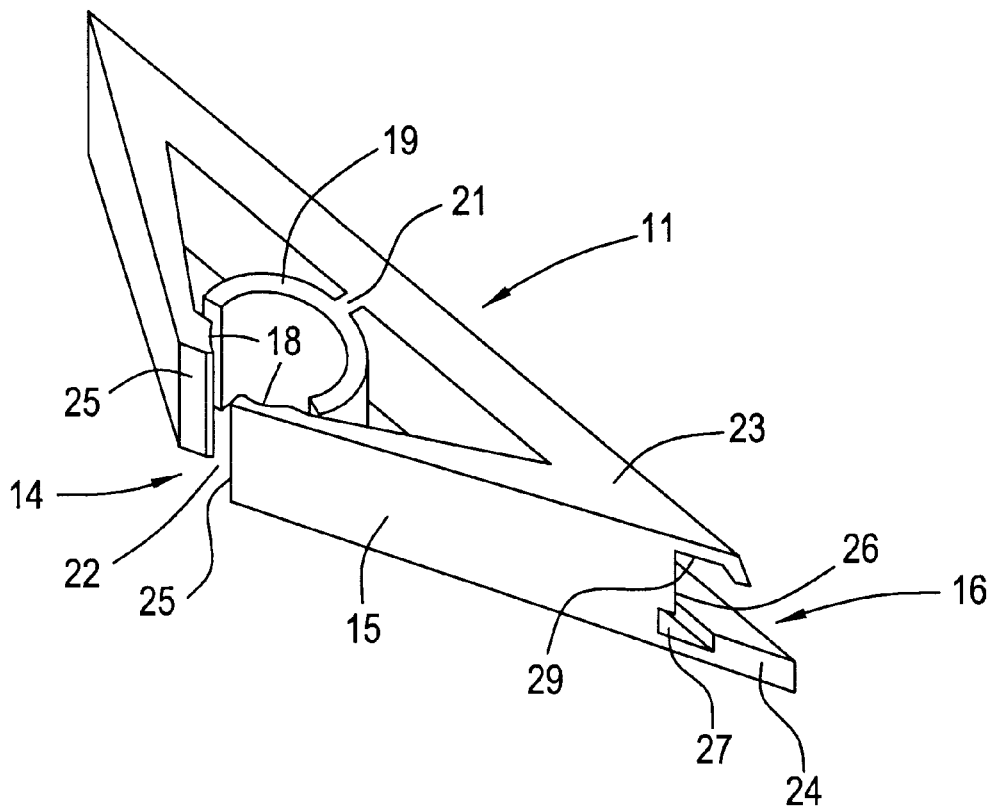
FIG. 3 is a preferred embodiment of a connecting member according to the present application.

FIG. 3 of the drawings is a preferred embodiment of a connecting member 11 which for sake of example only, is designed for gripping a compact-disk container. The connecting member 11 has an essentially triangular cross-section shape, the base of said triangle having a length essentially similar to the width of the container to be attached thereto. The connecting member 11 is made of a resilient material and is adapted for sliding along and rotating about said column 3 by means of a column embracing portion generally designated 14 and consisting of two resiliently displaceable embracing arms 15 projecting from a container gripping portion generally designated 16. Each of the embracing arms 15 comprises adjacent its end an inner annular segment 18. A third annular segment 19 is rigidly connected by a rib 21 to said gripping portion 16, whereby, the annular segments 18 and 19 form together a three-segment annular collar having a diameter slightly smaller than that of the column 3. The ends of the embracing arms 15 are spaced from one another by gap 22 and have slanted edges 25 serving as gliding surfaces.

The arrangement is such that the connecting members 11 may be snappingly attached to the column 3 or detached therefrom by simply pushing or pulling the connecting member against the biasing embracing effect of the resilient gripping arms 15. In this way, containers may be added, removed or rearranged along the column 3 without removing all the other containers.

The gripping portion 16 is of essentially of U-shaped cross-section and consists of a top surface 23 and a bottom surface 24 projecting essentially horizontally from a rear wall 26. The distance between the surfaces 23 and 24 is essentially similar to the width of a standard compact-disk container. At the bottom surface 24, adjacent the rear wall 26, there is a groove 27 parallel to the wall 26 and the top surface 23 is formed with a downward projecting edge 28 and a groove 29, both also being parallel to rear wall 26.

Figure 4:
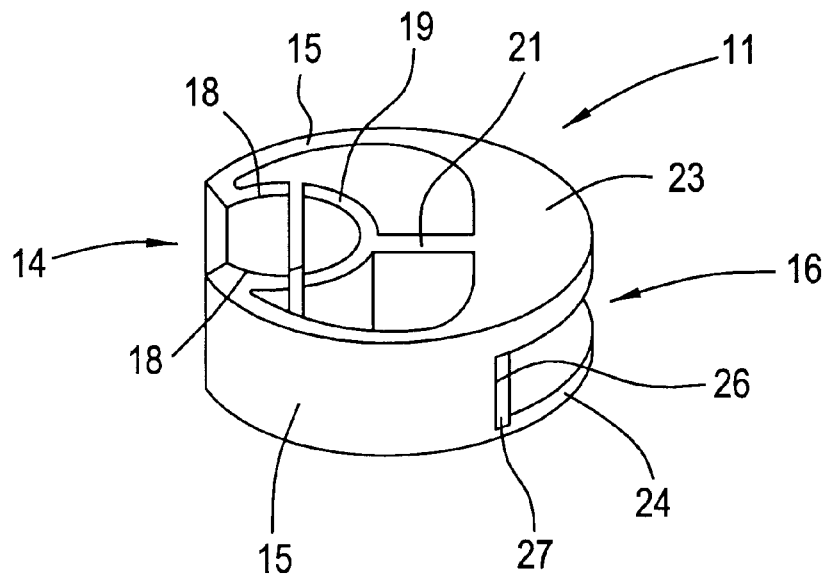
FIG. 4 is another embodiment of a connecting member according to the present invention.

Another embodiment of a connecting member according to the present invention is illustrated in FIG. 4, in which those components which are similar to those of the previous embodiment are designated with identical reference numerals. The second connecting member embodiment illustrated in FIG. 4 is also designed for gripping a compact-disk container and the difference between this embodiment and the one illustrated in FIG. 3 resides mainly in the gripping portion 16. In this embodiment the connecting member has a circular cross-section shape and the gripping portion 16 similar to the previous embodiment is of U-shaped cross-section consisting of a top surface 23 and a bottom surface 24 projecting essentially horizontally from a rear wall 26. The distance between the surfaces 23 and 24 is essentially similar to the width of a standard compact-disk container. The bottom surface 24, is formed adjacent the rear wall 26 with a groove 27 parallel to the wall 26 and the top surface 23 is essentially flat with no groove.

Figure 5A:
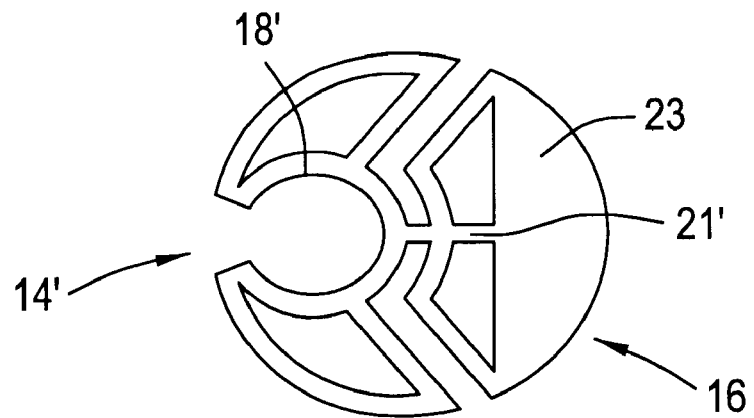
FIGS. 5(a)–5(e) arc various embodiments of a connecting member according to the present invention.
Figure 5B:
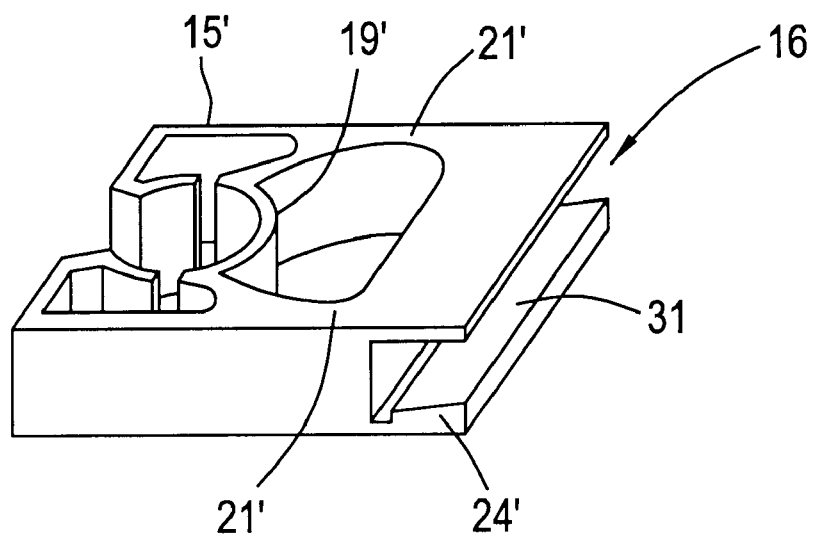
Figure 5C:
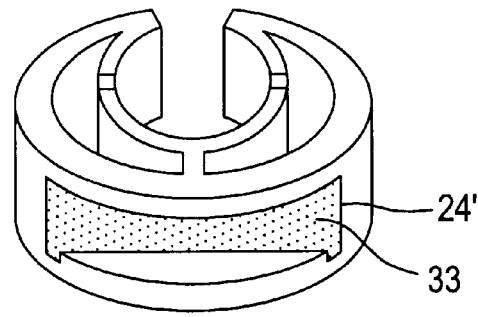

FIGS. 5(a) to 5(c) are different modifications of the connecting members it hereinbefore described. All the connecting members 11 are made of a resilient material and are adapted for sliding along and rotating around the column 3 by means of an integral embracing portion 14 consisting of two displaceable embracing arms 15 formed with annular segments which together form an essentially annular cross-section shaped collar having an inner diameter similar or slightly smaller than that of the column's 3.

The modification of FIG. 5(a) has also an essentially circular cross-section shape and it differs from the previous embodiments in the embracing portion 14' which in this modification is constituted of a single wide angle annular segment 18' attached by a central rib 21' to the gripping portion 16.

The modification of FIG. 5(b) differs from the embodiment of FIG. 4 in that it has an essential rectangular cross-section shape thus the embracing arms 15' are right angled rather than arcs and the central annular segment 19' is connected to the gripping portion 16 by two ribs 21'. Still another difference is that a top face 31 of the bottom surface 24' of the gripping, portion 16 is slightly inclined so as to compensate for deflection of the connecting member due to the container's weight.

The connecting member 11 of FIG. 5(c) is formed with a rear wall 24' provided with an adhesive substance 33 such as a double-faced glue strip or a Velcro™ adherent, for ensuring that the container (not seen) does not accidentally detach from the connecting, member.

Figure 5D:
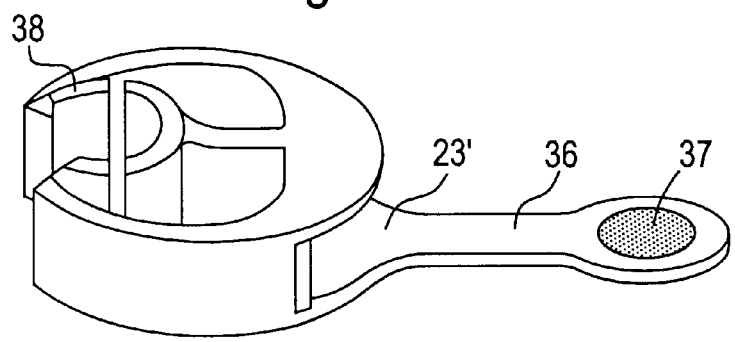

In FIG. 5(d) the bottom surface 23' has a projecting tongue 36 and comprises an adhesive patch 37 also useful in securing the container to the connecting, member. Alternatively, portion 37 may be a hook and pile attachment, also known as VELCRO®. Furthermore, this modification illustrates how a spacer 38 may be integrally formed with the connecting member 11 instead of using the unitary spacers 13 as seen in FIGS. 1 and 2.

Figure 5E:
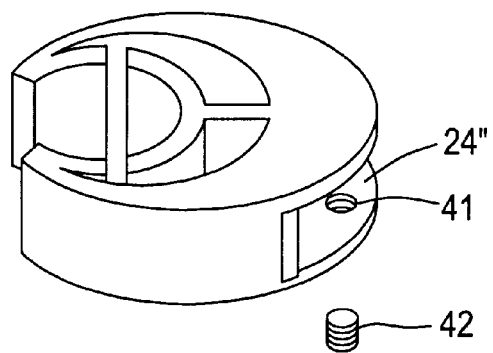

In FIG. 5(e) the bottom surface 24" is formed with a threaded bore 41 for accommodating a set screw 42 also useful in securing the container to the connecting member.

Reference is now made to FIG. 6 in which again, only for sake of example it will be explained how a typical compact-disk container 45 is gripped by a connecting member 11 attached to a column 3. The container comprises a base member 46 and a flap 47 hinged at a rear portion 48 of the container. Such containers 45 are typically formed at all edges of at least the base member 46 with a ridge 49 projecting from the bottom surface 51.

The container 45 is further provided at its front end with a ridge 52 vertically projecting from a top surface 53 of the base member 46. Connecting, the container to the connecting member is performed either by sliding the front edge of the container between the top surface 23 and bottom surface 24 of the connecting member or by snappingly attaching the container to the connecting member, whereby the ridges 49 and 52 are snugly accommodated within the grooves 27 and 29 respectively. In this way the container is attached to the connecting member and is horizontally retained with respect to the column 3, where the flap 47 closes over the top surface 23 of the connecting member 11.

The arrangement is such that since the top surface 23 and the bottom surface 24 are essentially as long as the width of the container, dust is prevented from penetrating into the container, when the flap 47 closes over the top surface 23 without any interstice therebetween.

As an option, a projecting member 56 is added above the top surface 23 for engaging the top surface of flap 47 in a snapping manner, whereby, closing and opening the flap require applying some pressure so that the flap does not open spontaneously and is better retained in its closed position.

Figure 6:
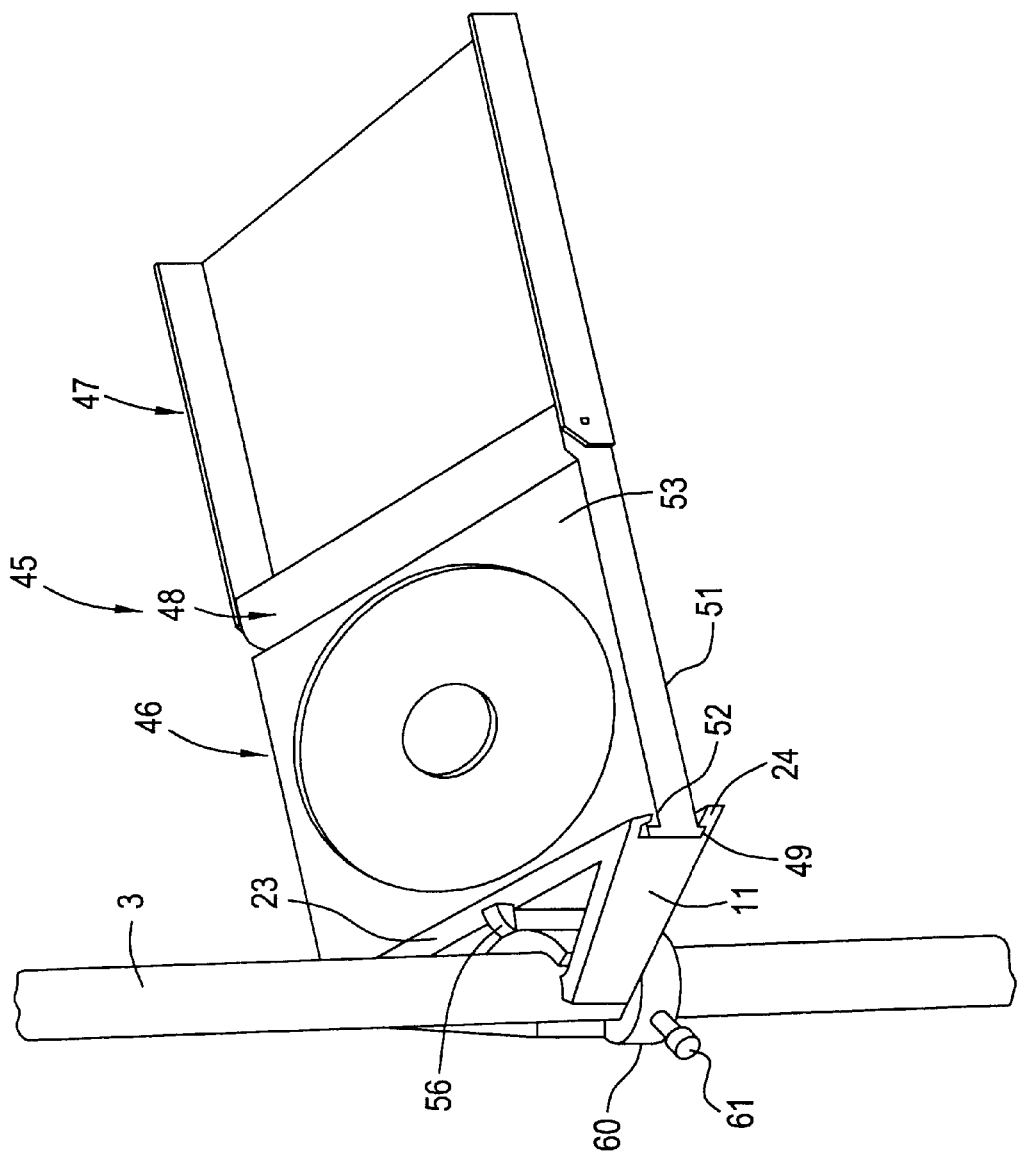
FIG. 6 illustrates a compact-disk container gripped by a first embodiment connecting member with the flap in an open position.

As can also be seen in FIG. 6 instead of using the lower limit member 2 as seen in FIGS. 1 and 2 there is provided a lower limit adjusting ring 60 comprising a fixing screw 61 by means of which the ring 60 may easily be fixed at any desired height for limiting the height of the lower-most connecting member.

Figure 7:
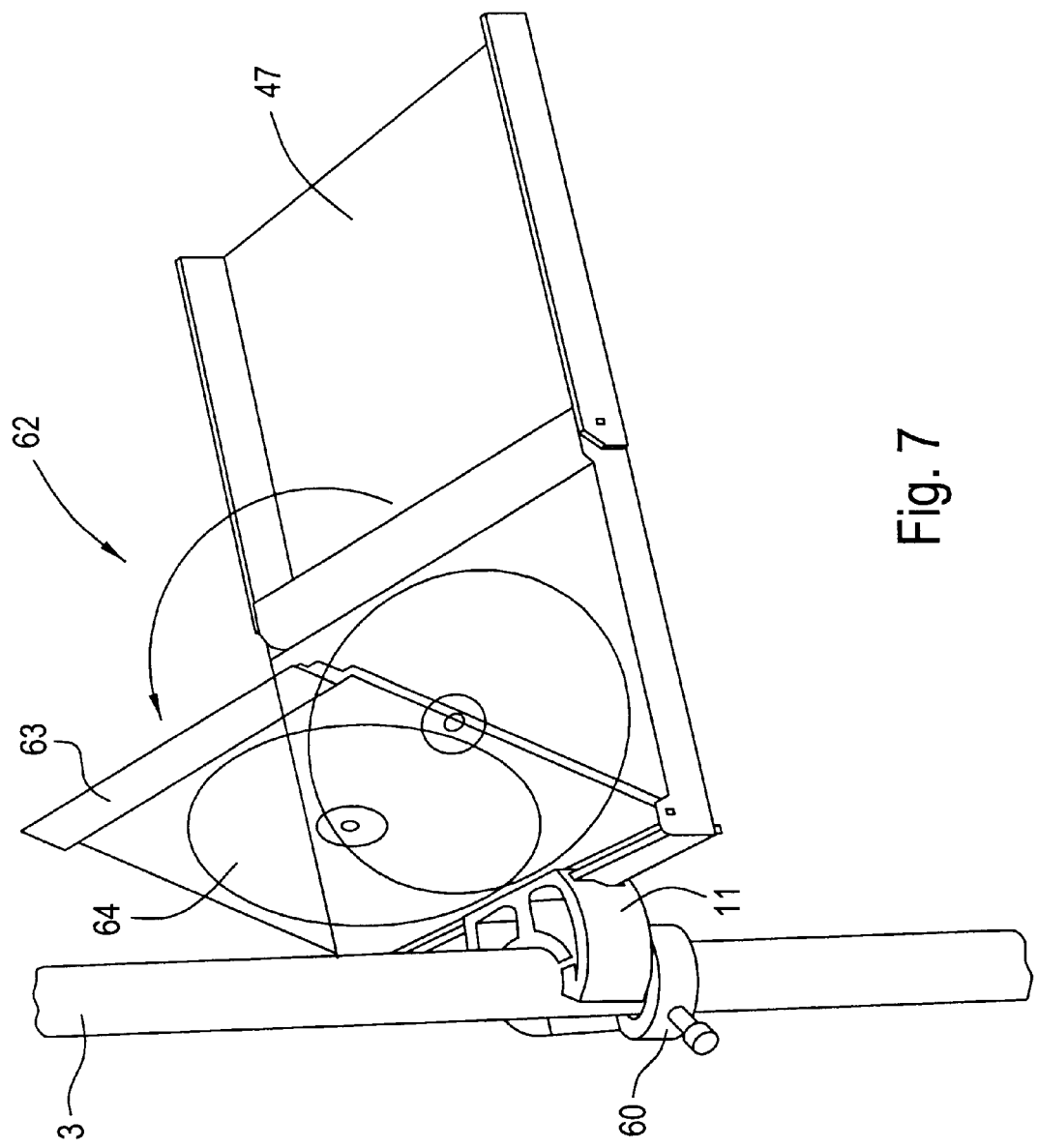
FIG. 7 illustrates how the connecting member is useful for gripping a new type double compact-disk container.

The connecting member 11 according to the embodiment of FIG. 3 is suitable also for use with a double compact-disk container 62 accommodating two compact-disks, as illustrated in FIG. 7. However, in FIG. 7 the connecting, member has a circular cross-section shape but all the other features are similar to those of the embodiment of FIG. 3. Using this type of containers 62, the flap 47 is freely opened as well as the inner flap 63, whereby, both disks 64 (only one of which is seen) are easily approachable as well as the booklet (not shown) normally enclosed with compact-disks and held in the flap 47.

Figure 8:
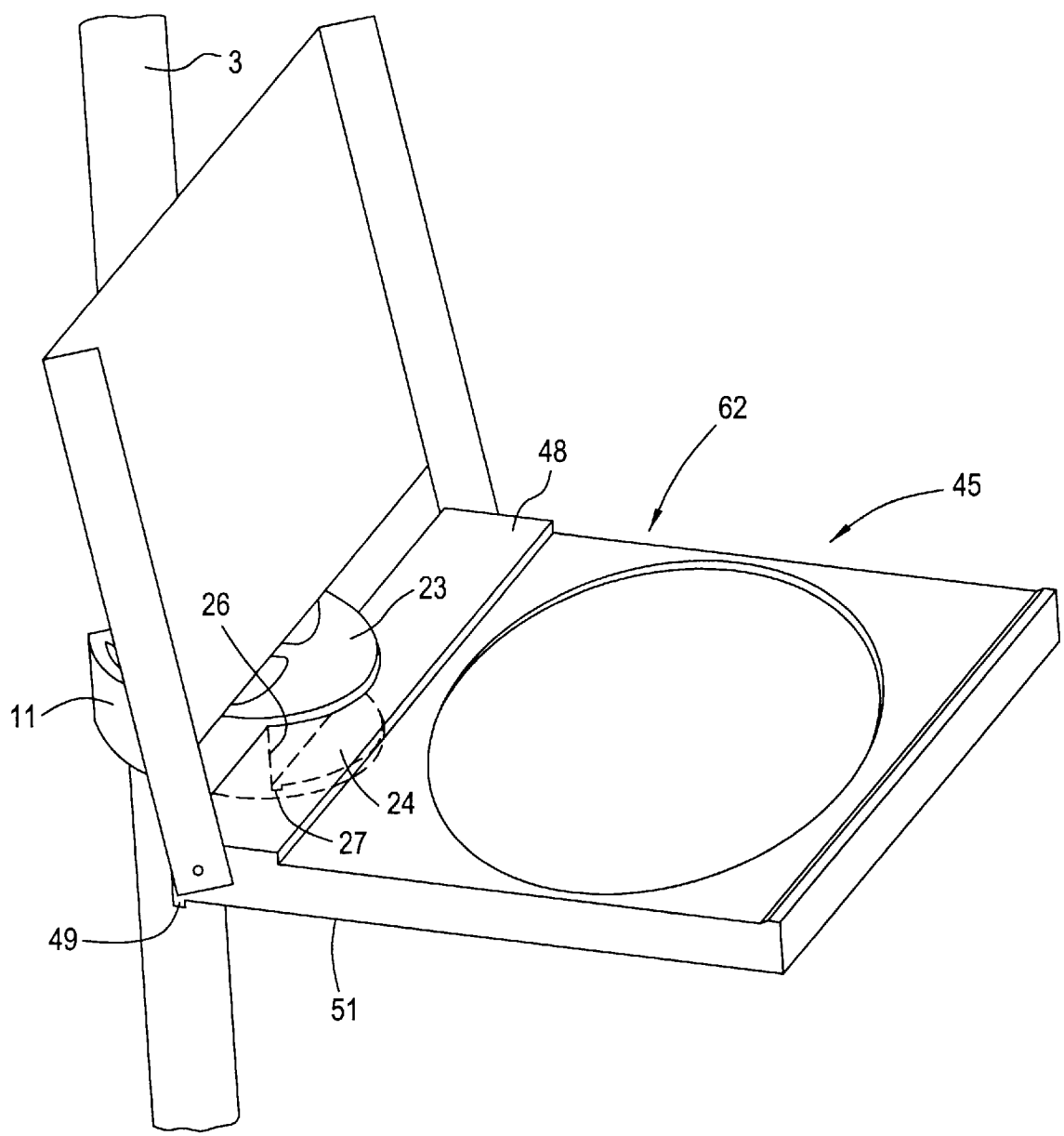
FIG. 8 illustrates a compact-disk container gripped by a connecting member according to a second embodiment of the present invention with the flap in its open position.

In FIG. 8 of the drawings it is seen how a connecting member according to the second embodiment (seen in FIG. 4) is used for gripping a compact-disc container 62. The container is attached to the connecting member 11 by snappingly inserting the rear portion 48 of the container into the gripping portion 16 of the connecting member whereby, the ridge 49 of the container's bottom surface 51 snaps into groove 27 and the top and bottom surfaces 23 and 24 respectively, clamp the end portion 48 of the container with the rear wall of the container bearing against the rear wall 26 of the connecting member. Detaching the container 45 from the connecting member 11 is carried out by applying force in an opposite direction to that of assembling.

The assembled compact-disk container 45 and connecting member 11 may than be snappingly attached to the column 3 as already explained whereby, the container is gripped essentially horizontally by the connecting member attached to the column 3 and may be removed from the column by simply pulling the container which results in detaching the connecting member from the column.

Figure 9:
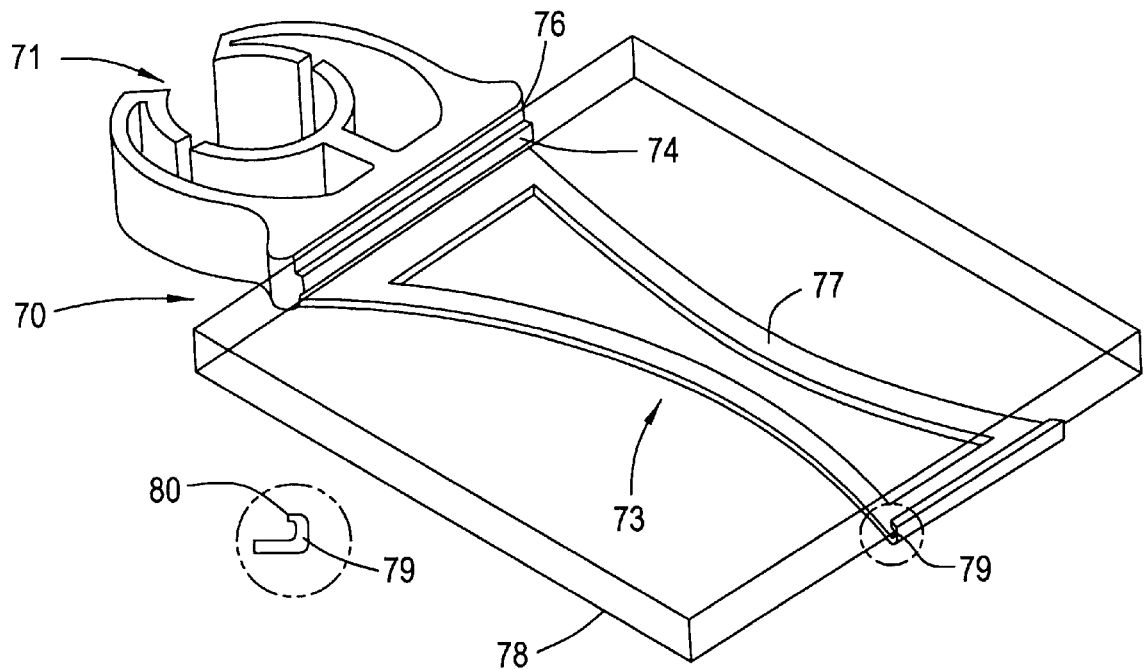
FIG. 9 is another embodiment of a connecting member according to the present invention.

FIG. 9 illustrates another embodiment of a connecting member generally, designated 70, in which the embracing portion 71 may be, for example, similar to any one of the previous embodiments illustrated in FIGS. 3–5.

However, in the present embodiment, the gripping portion 73 comprises at the rear wall 76 a flat substantially vertical surface 74 and an arm 77 laterally extending below the surface 74 and having a length substantially equal to the length of a container 78 illustrated by dashed lines. At the end of arm 74 there is a bracket 79 projecting upwards with a lateral projection 80 adapted for embracing the container 78 between said projection and the flat surface 74.

Figure 10:
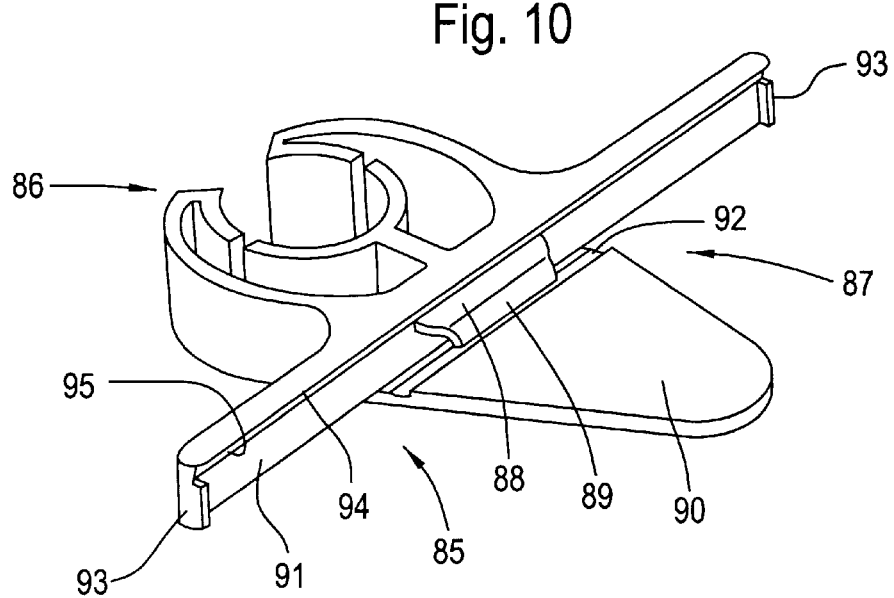
FIG. 10 illustrates a preferred embodiment of a connecting member in accordance with the present invention.

In the embodiment of FIG. 10, the connecting member generally designated 85 is provided with an embracing portion 86 as hereinbefore explained and a gripping portion 87 comprising a top support bracket 88 with a downward projecting ridge 89 and a bottom tongue 90 projecting from the rear wall 91 and formed adjacent the rear wall with a groove 92, whereby the container (not shown) may be gripped as already explained in connection with the embodiment of FIG. 3.

The back wall 91 further comprises at each end thereof a lateral, vertical projection 93, the distance between the vertical projections being equal to or slightly larger than the width of the compact disk container (not shown), useful for preventing movement of the container in the horizontal plane.

Adjacent to the top edge of the back wall 91, above the top bracket 88, there is a provided a longitudinal lateral projection 94 extending substantially the entire length of the back wall 91 and having a slanted bottom surface 95. The purpose of the projection 94 is on the one hand to seal the interstice between the container and its hinged flip cover so as to prevent dust from entering the container and, on the other hand, to snappingly engage the cover of the container as it is closed. However, instead of a continuous projection 94, several bulges may be used for the purpose of snapingly engaging the cover.

Figure 11:
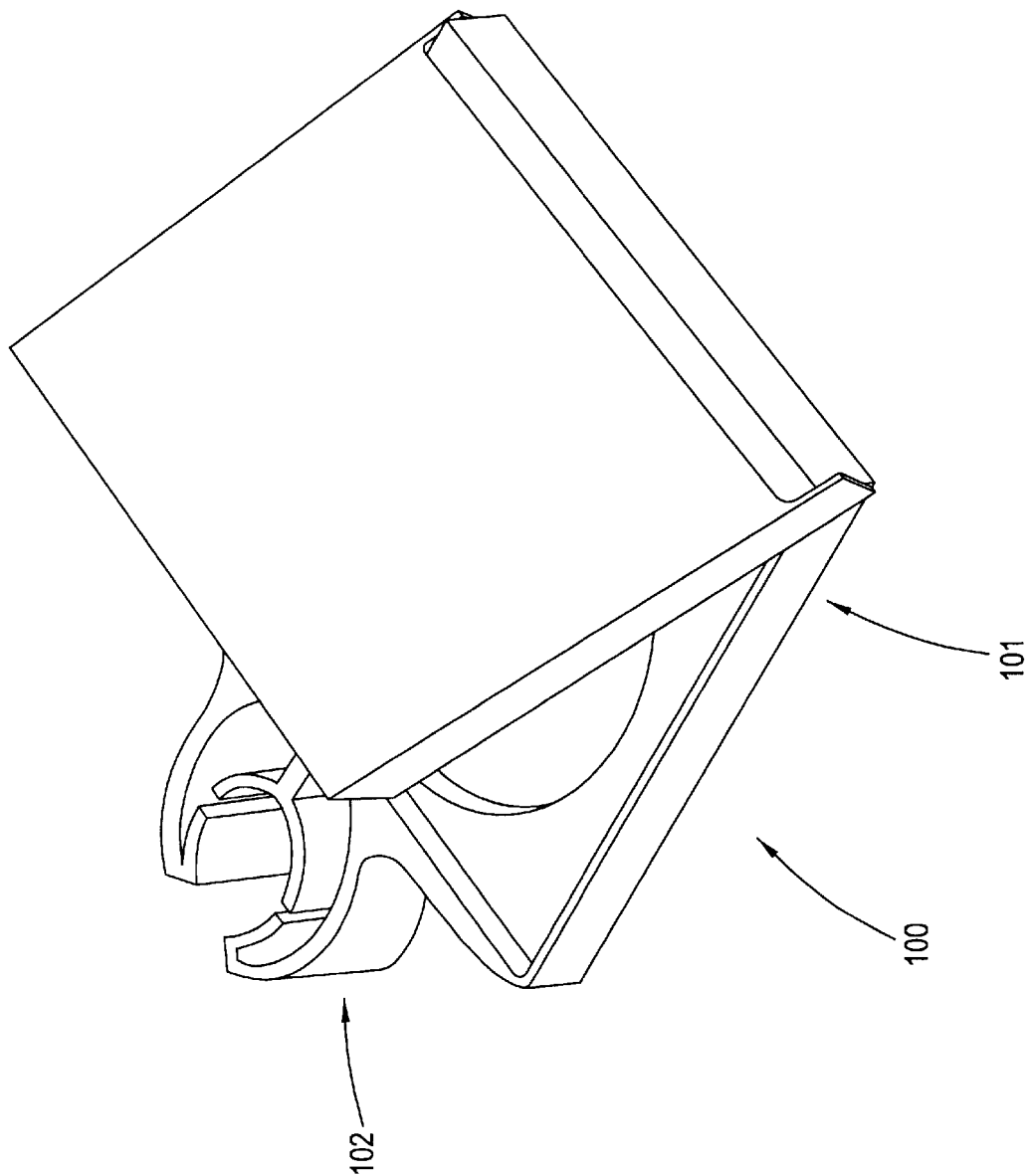
FIG. 11 is a further embodiment of the present invention, in which the compact disk container is integrally formed with a connecting member.

Attention is now directed to FIG. 11 of the drawings, in which the compact disk container generally designated 100 consists of a container portion 101 and an integrally formed embracing member 102 at a side of the container opposite the hinged side. Alternatively, the embracing member may be formed at the hinged side.

Figure 12:
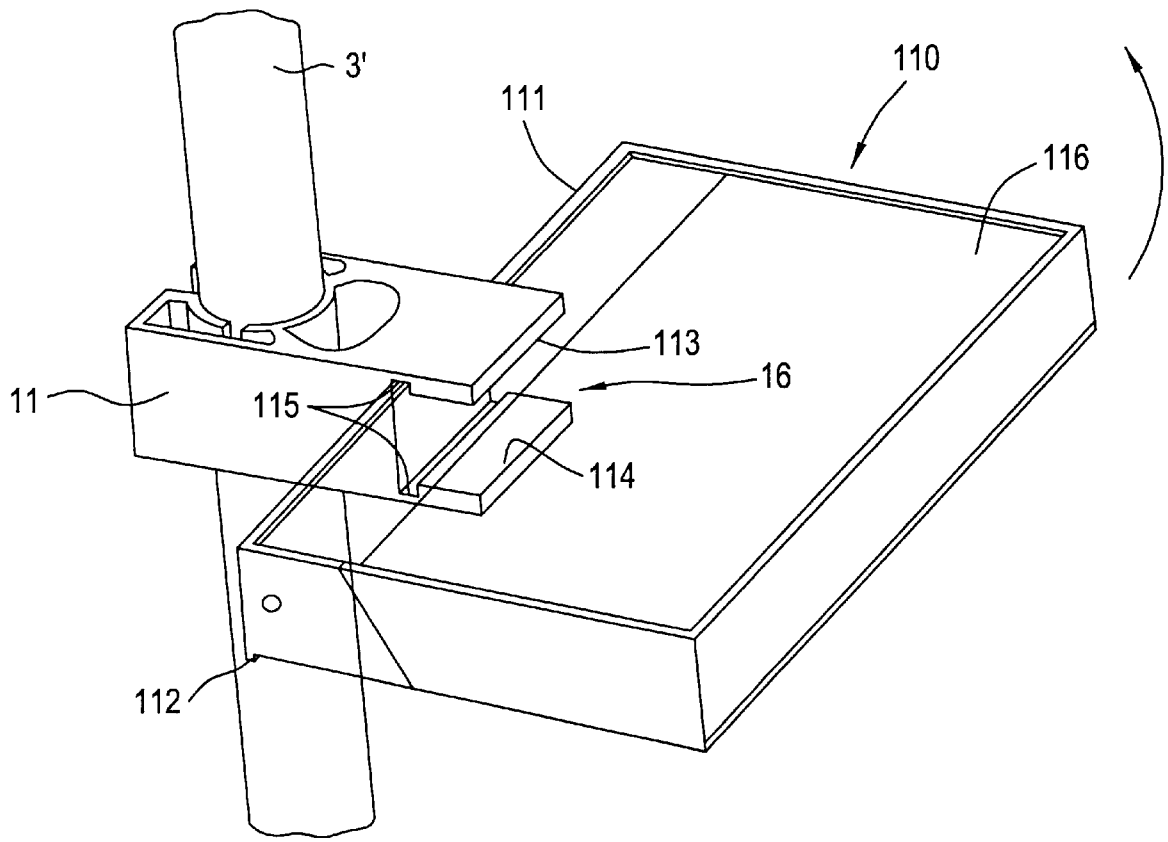
FIG. 12 illustrates a connecting member according to the present invention suitable for gripping an audio cassette container.

FIG. 12 of the drawings illustrates a connecting member according to the present invention suitable for gripping a typical audio cassette container 110. The audio container is also formed at its top and bottom surfaces with upright projecting ridges 111 and 112 respectively and the top and bottom surfaces 113 and 114 of the connecting member are each provided with a groove 115, the distance between the surfaces 113 and 114 being essentially similar or slightly less then the thickness of the container 110.

When the container is forcefully introduced into the gripping portion 16' the top and bottom ridges 111 and 112 snap into the grooves 115 whereby, the container is fixed to the connecting member and the flap 116 may be easily opened and its contents be drawn without detaching the container from the connecting member.

Because of the snapping engagement of the container within the connecting member effective gripping of the container is provided even if the thickness of the containers differs between manufacturers and designs.

Figure 13:
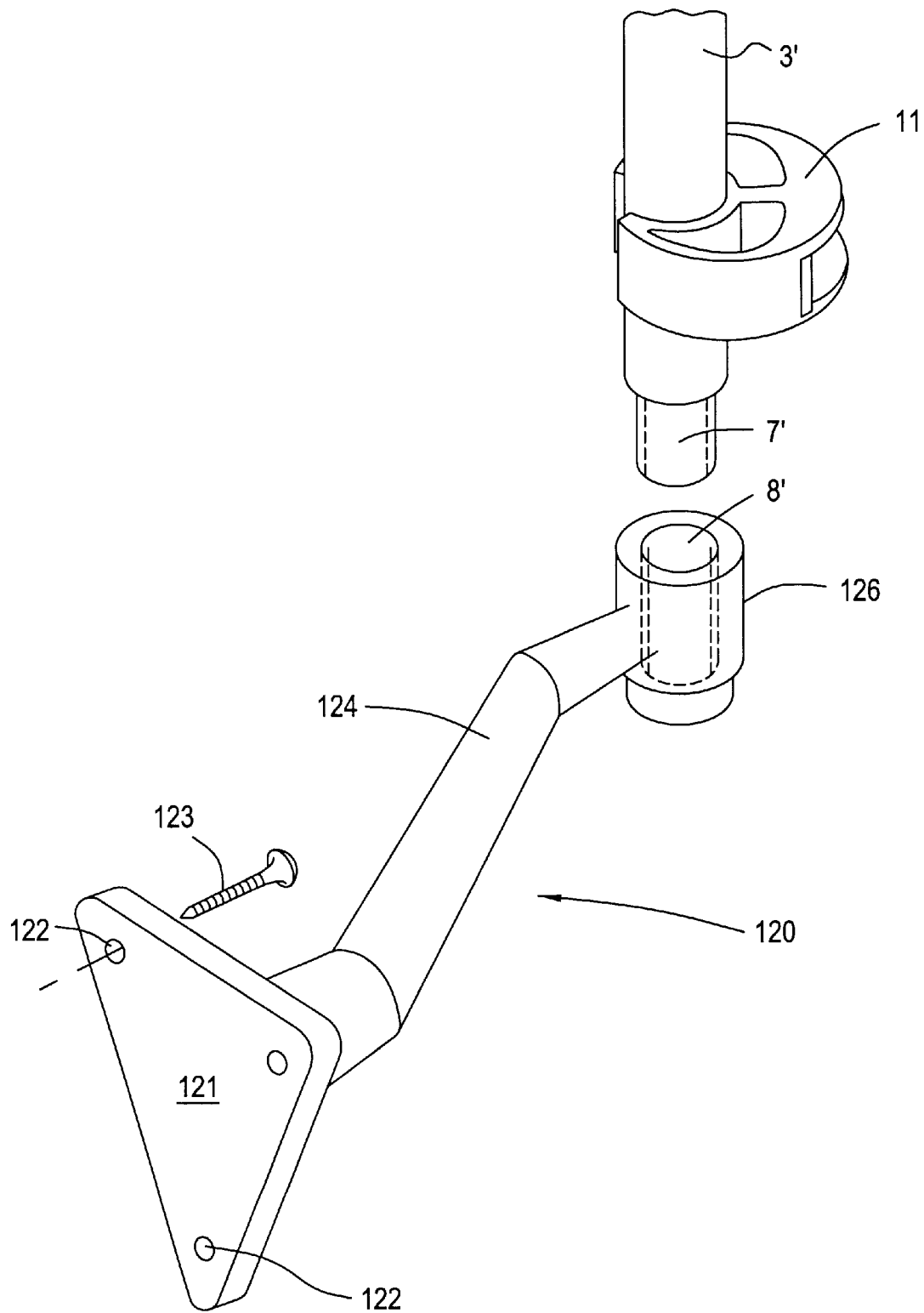
FIG. 13 illustrates a wall mounted device according to the present invention.

FIG. 13 illustrates how the storage and display device according to the present invention may be mounted on a wall, a bookcase or any other essentially vertical surface by means of a wall bracket mounting device 120 formed with a wall plate 11 with holes 122 for receiving screws 123 and an arm 124 fixed at one end thereof to said wall plate 121 and at the opposed end there is an internally threaded cup-like member 126 with a threaded bore 8' adapted for receiving the threaded shank 7' of the column 3' as previously explained.

It should, however, be obvious that the storage and display device according to the present invention may be adapted by suitable means for floor and table-top mounting, suspension from a ceiling or table, for wall mounting etc.

Figure 14:
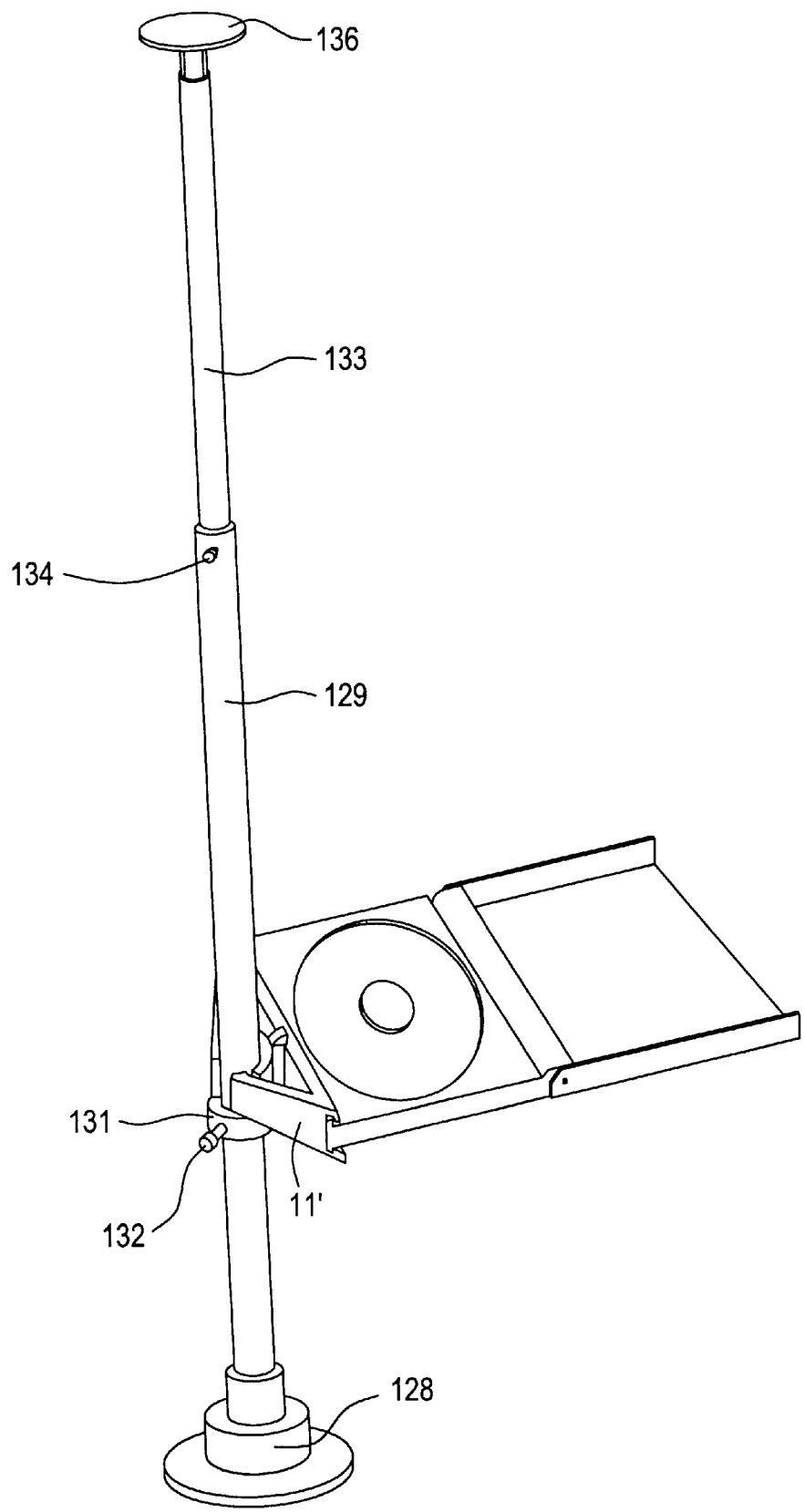
FIG. 14 illustrates a floor-to-ceiling device according to the present invention.

In FIG. 14 of the drawings there is provided a floor-to-ceiling device according to the present invention comprising a floor support 128, a column 129 with a lower limit adjusting ring 131 slidable along said column and fixable by means of the fixing screw, 132 for setting the minimum height of the lower-most container on the column and a plurality of connecting members 11' mounted on the column as previously explained (for illustration only one is shown). A tube 133 is telescopically received within the column 3' and is fixed within the column by a fixing pin 134. A height adjustable ceiling plate 136 may be screwed in or out of the tube 133 for fine height adjusting so as to obtain tight clamping between the ceiling and the floor(not shown). In this way even if a large number of containers is stored on the column, the device still remains steady. Other solutions may just as well be given to adjust the height of the device between the floor and ceiling.

Figure 15:
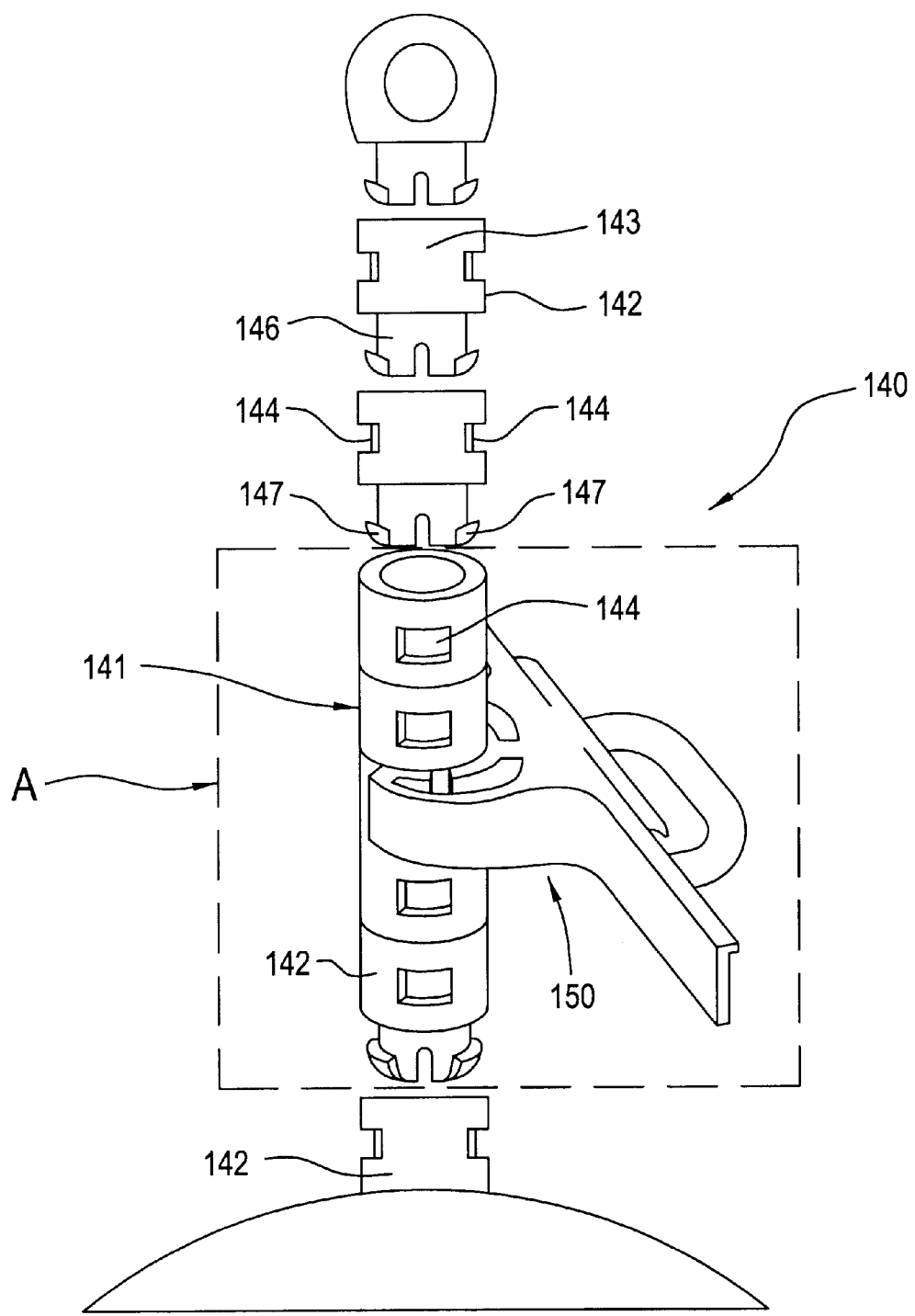
FIG. 15 is a partially exploded side view of a floor model of another embodiment according to the present invention with a section A shown in perspective view.

Referring now to FIG. 15 of the drawings, there is shown a floor/table top model device designated 140, in which the column 141 consists of a plurality of column components 142, each comprising at a top portion 143 two windows 144 and a bottom portion 146 having a reduced diameter adapted for accommodation within the top portion 143. The bottom portion 146 comprises two flexible lateral projections 147 adapted for snap-fitting to mate so as to couple two consecutive column components 143 as seen in the perspective illustration of portion A.

As seen in FIG. 15, the top portion 143 of each column component 142 has substantially the height of a connecting, member 150, whereby the overall height of the column 141 conforms with that of the number of the containers held by the device. Each time it is required to add a container, a column component 143 is added.

It should be obvious to a person versed in the art that the column components and accessories may be connected to one another in a variety of different ways and not necessarily by screw engaging. It should further be obvious that the connecting members may vary in shape and design and may consist of any desired combination of the above mentioned modifications mutatis mutandis.

We claim:

1. A modular storage and display device for essentially flat containers, the essentially flat containers having a base member, a rear edge, and at least two side edges, the device comprising:

a vertically retained column; and a plurality of connecting members mounted on said column, said connecting members having a first portion and a second portion, the first portion being integrally formed with a pair of resiliently displaceable gripping arms that snap fit around the column so as to be rotatable around and slidable along a longitudinal axis of the columns, the second portion of the connector having retaining means for horizontally retaining the container at one of the rear and side edges of the container.

2. The modular storage and display device according to claim 1, further comprising a plurality of column components engageable with one another for extending the column.

3. The modular storage and display device according to claim 1, further comprising a wall bracket mounting device for wall mounting the column.

4. The modular storage and display device according to claim 1, further comprising a base member supporting a first end of the column and a ceiling engaging member supporting a second end of the column, such that the column is supported at the first and second ends in a floor-to-ceiling installation.

5. The modular storage and display device according to claim 1, further comprising a base member for supporting said column on one of a floor and a table top.

6. The modular storage and display device according to claim 1, further comprising suspending means for suspending the device from one of a desk top and a ceiling.

7. The modular storage and display device according to claim 1, further comprising at least one elevating member for setting the height of a lowermost connecting member.

8. The modular storage and display device according to claim 1, further comprising a spacer between each adjacent pair of connecting members, said spacer being at least one of integral with the connecting members and a separate element mounted on said column.

9. The modular storage and display device according to claim 1, wherein the retaining means of said connecting member includes a U-shaped gripping portion having top and bottom essentially horizontally extending supports, a distance between said top and bottom supports being essentially equal to a thickness of the container, at least one of said supports being provided with a groove adjacent a rear wall of the retaining means, the groove snappingly receiving a ridge vertically projecting from an edge of the base member of said container such that the rear edge of said container is engaged between said supports and abuts the rear wall of said retaining means.

10. The modular storage and display device according to claim 1, wherein the base member of the container comprises a front wall, a rear wall, two side walls, and a hinged flap proximate the rear wall, wherein said retaining means of said connecting member includes a U-shaped gripping portion having top and bottom essentially horizontally extending supports, said top support providing a groove for receiving a top edge of the front wall of the container, such that said front wall of the container is engaged by said retaining means when the front wall of the container abuts a rear wall of said retaining means whereby the hinged flap of the container is closable over said top support.

11. The modular storage and display device according to claim 1, further comprising attachment means for attaching the container to said retaining means of the connecting member.

12. The modular storage and display device according to claim 11, wherein said attachment means comprise one of an adherent portion and a hook and pile fastener portion.

13. The modular storage and display device according to claim 11, wherein said attachment means comprise a set screw for securing the container within said retaining means.

14. The modular storage and display device according to claim 11, wherein said attachment means further comprises a longitudinal horizontal protrusion extending essentially along an entire width of the container and having a slanted bottom surface for snappingly engaging a top surface of the hinged flap of the container.

15. The modular storage and display device according to claim 10, wherein the rear wall of said retaining means of said connecting member further comprises a longitudinal projection and a vertical projection at each end of the rear wall, such that the container is secured between said projections.

16. The modular storage and display device according to claim 1, wherein said retaining means comprises a first vertical wall and a second vertical wall, said second vertical wall being supported by an arm and positioned opposite said first vertical wall, a distance between the first and second vertical walls being essentially equal to a length of the container, whereby the container is retained between said first and second vertical walls.

17. The modular storage and display device according to claim 1, wherein said resiliently displaceable gripping arms comprise an essentially annular cross-sectioned element made of a resilient material having an internal diameter similar to an outer diameter of said column and provided with at least one radial opening for snappingly receiving said column.

18. The modular storage and display device according to claim 17, wherein said annular cross-sectioned element comprises a pair of resilient segments and one fixed segment.

19. The modular storage and display device according to claim 2, wherein each of said column components has a height substantially equal to a height of the connecting members.

20. A connecting member for use in a modular storage and display device for essentially flat containers such as compact disk, video and audio cassette containers and the like, the essentially flat containers having a base member, a rear edge, a front edge, and at least two side edges, the connecting member comprising:
    a resilient attachment for snappingly engaging a substantially vertical column so as to be rotatable around and slidable along a longitudinal axis of said column; and
    retaining means for retaining the container at one of the rear edge, the front edge and the side edges of the container such that the container is horizontally retained and opening of a flap of the container and removal of contents of the container can occur while the container is retained by the connecting member.

21. The connecting member according to claim 20, wherein said retaining means comprises top and bottom essentially horizontally extending flat supports, a distance between said top and bottom supports being essentially equal to a thickness of the container, at least one of said supports having an internal groove adjacent a rear wall of the retaining means for accommodating a ridge vertically projecting from a flat face of said container such that a hinged edge of said container is retained between said top and bottom supports and the rear edge of said container abuts a rear wall of said retaining means.

22. The connecting member according to claim 20, wherein said retaining means comprises top and bottom essentially horizontally extending flat supports, said top support comprising a groove for receiving a top edge of the front edge of said container, such that one of the front edge and the side edge of said container is retained by said retaining means with the retained edge abutting a rear wall of the retaining means and a hinged flap of the container closing on said top support.

23. The connecting member according to claim 20, wherein a rear wall of the retaining means comprises a longitudinal projection and a vertical projection at each end of the rear wall for arresting the container between said projections and preventing movement of the container in a horizontal plane.

24. The connecting member according to claim 20, further comprising attachment means for attaching the container to the retaining means of the connecting member.

25. The connecting member according to claim 24, wherein said attachment means comprise a set screw for securing the container within said retaining means.

26. The connecting member according to claim 24, wherein said attachment means comprise one of an adherent portion and a hook and pile fastener portion.

27. The connecting member according to claim 22, wherein a length of said top support is essentially similar to a width of the container.

28. The connecting member according to claim 20, wherein said retaining means comprises a first vertical wall and a second vertical wall, said second vertical wall being supported by an arm and positioned opposite said first wall, a distance between the first and second vertical walls being essentially equal to at least one of a length and a width of the container, whereby the container is retained between said first and second vertical walls.

29. The connecting member according to claim 22, further comprising a longitudinal horizontal protrusion extending essentially along an entire width of the container and having a slanted bottom surface for snappingly engaging a top surface of the hinged flap of the container.

30. The connecting member according to claim 20, wherein said resilient attachment comprises an essentially annular cross-sectioned element made of a resilient material having an internal diameter similar to an outer diameter of said column and provided with at least one radial opening for snappingly receiving said column.

* * * * *